(12) United States Patent
Xie

(10) Patent No.: US 11,614,224 B2
(45) Date of Patent: Mar. 28, 2023

(54) FIREWORKS LAMP

(71) Applicant: Huarong Xie, Dongguan (CN)

(72) Inventor: Huarong Xie, Dongguan (CN)

( * ) Notice: Subject to any disclaimer, the term of this patent is extended or adjusted under 35 U.S.C. 154(b) by 0 days.

(21) Appl. No.: 17/359,754

(22) Filed: Jun. 28, 2021

(65) Prior Publication Data

US 2022/0065429 A1 Mar. 3, 2022

(30) Foreign Application Priority Data

Sep. 1, 2020 (CN) .......................... 202021875136.4
Apr. 7, 2021 (CN) .......................... 202120708226.2

(51) Int. Cl.
*F21V 21/108* (2006.01)
*F21S 4/20* (2016.01)
*F21V 17/16* (2006.01)

(52) U.S. Cl.
CPC .............. *F21V 21/108* (2013.01); *F21S 4/20* (2016.01); *F21V 17/16* (2013.01)

(58) Field of Classification Search
CPC ........ F21V 21/108; F21V 17/16; F21V 17/14; F21S 4/20
See application file for complete search history.

(56) References Cited

U.S. PATENT DOCUMENTS

| | | | |
|---|---|---|---|
| 2003/0016544 A1* | 1/2003 | Huang .................... | F21V 21/10 362/249.16 |
| 2003/0156411 A1* | 8/2003 | Ahroni ...................... | F21S 2/00 362/249.01 |
| 2004/0190309 A1* | 9/2004 | Bixler ....................... | F21S 4/20 362/565 |
| 2013/0051079 A1* | 2/2013 | Xu ............................ | F21S 4/10 362/640 |

* cited by examiner

*Primary Examiner* — Leah Simone Macchiarolo
(74) *Attorney, Agent, or Firm* — Rumit Ranjit Kanakia

(57) ABSTRACT

The present disclosure relates to the technical field of illumination of decorative lamps, and discloses a fireworks lamp. The fireworks lamp includes a shell structure, a lamp body structure and a circuit board. The shell structure includes a connector and a plurality of connection sleeves, the lamp body structure includes a plurality of casings and light-emitting light sources arranged inside the plurality of casings, the connector has at least one circular section, and the plurality of connection sleeves are arranged at a periphery of the circular section at equal intervals, and the plurality of casings, light-emitting light sources and connection sleeves have the same quantity. The present disclosure further discloses a floor decorative lamp.

12 Claims, 15 Drawing Sheets

FIREWORKS LAMP

CROSS REFERENCE TO RELATED APPLICATION

The present application claims priority to China patent applications No. 202021875136.4 filed on Sep. 1, 2020 and 202120708226.2 filed on Apr. 7, 2021, the entire contents of which are incorporated herein by reference.

TECHNICAL FIELD

The present disclosure belongs to the technical field of decorative lamps, in particular to a fireworks lamp and a floor decorative lamp including the fireworks lamp.

BACKGROUND

With the continuous development of the society and the advancement of science and technology, there are more and more decorative lamps. Some of existing fireworks decorative lamps are made by directly connecting a plurality of copper wire lights, which are not attractive enough and have an unideal decorative effect. Some fireworks decorative lamps have a star-shaped structure, but the interior is laser light, so that these lamps have a poor variability in light source and are not easily adjusted. Moreover, the structure is not strong enough, so that these lamps are easily damaged during transportation and use. Therefore, existing products need to be further improved.

SUMMARY

The technical problem to be solved by the present disclosure is to overcome the defects in the prior art, and an improved fireworks lamp is provided.

The embodiments of the present disclosure are realized below. A fireworks lamp includes a shell structure, a lamp body structure and a circuit board. The shell structure includes a connector and a plurality of connection sleeves, the lamp body structure includes a plurality of casings and light-emitting light sources arranged inside the plurality of casings, the connector has at least one circular section, and the plurality of connection sleeves are arranged at a periphery of the circular section at equal intervals, the plurality of casings, light-emitting light sources and connection sleeves have the same quantity, the plurality of casings are in snap-in connection with the plurality of connection sleeves, and the plurality of casings have a semi-transparent or transparent structure.

Further, an outer wall of each connection sleeve is provided with one or more stop blocks, and a bottom of each casing is symmetrically provided with one or more stop clamping slots matching with the stop blocks.

Further, each stop clamping slot has an L shape and includes a longitudinal slot in a lengthwise direction of each casing and a transverse slot perpendicular to the longitudinal slot, and an end having an opening of each casing is provided with a trapezoid stop block.

Further, part or all of the plurality of connection sleeves are formed by buckling two symmetric parts.

Further, each light-emitting light source is a copper wire light, and the copper wire light in each casing has a length greater than half of that of each casing.

Further, the plurality of connection sleeves extend outward from the shell structure in a radial manner, and are symmetrically disposed on a surface of the shell structure.

Further, the connector has a disk shape, and the plurality of connection sleeves are arranged in the same plane.

Further, the present disclosure further provides a floor fireworks lamp, including the above-mentioned fireworks lamp and a plug rod. The plug rod is connected with the fireworks lamp.

Further, the plug rod is provided with an antiskid casing, a battery bin or a solar battery box.

The present disclosure has the advantages of convenience in carrying and installation and adaptability to various occasions. By means of the built-in circuit board, the light-emitting light sources (copper wire lights are preferred) in the casings can be controlled to emit dynamic light in different colors, so that illumination and a decorative effect can be achieved. Furthermore, when the lamp is turned off, branches of the lamp are symmetric, so that the decorative effect is strong.

BRIEF DESCRIPTION OF THE DRAWINGS

The accompanying drawings are used to provide a further understanding of the present disclosure and constitute a part of the present specification to explain the present disclosure together with the embodiments of the present disclosure, and do not constitute restrictions to the present disclosure.

DESCRIPTION OF THE EMBODIMENTS

The preferred embodiments of the present disclosure are described below with reference to the accompanying drawings, and it should be understood that the preferred embodiments described herein are merely illustrative and explanatory of the present disclosure and are not restrictive of the present disclosure.

Figure 1:
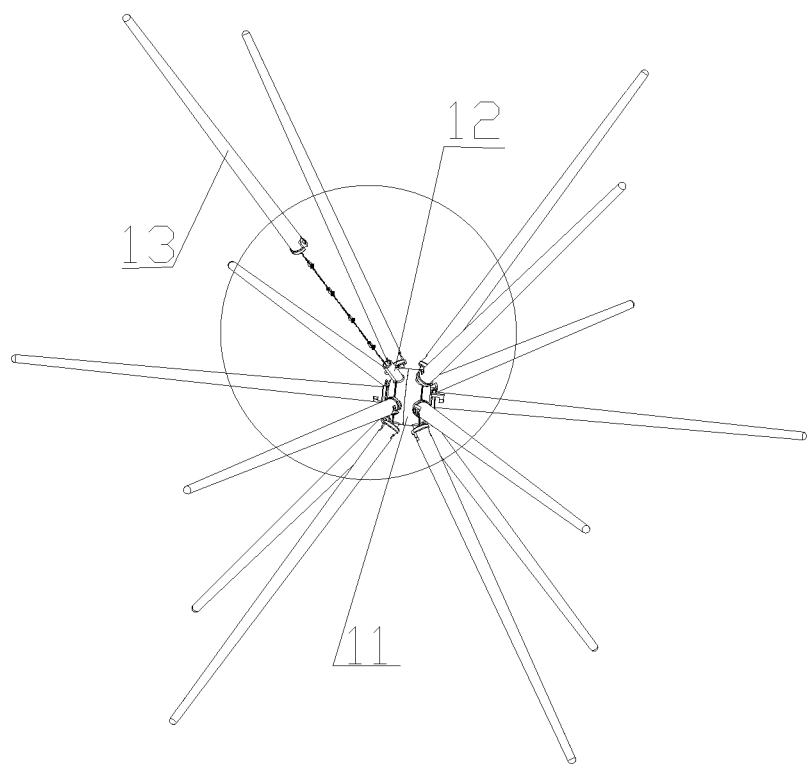
FIG. 1 is a schematic structural diagram of a fireworks lamp of the present disclosure.
Figure 2:
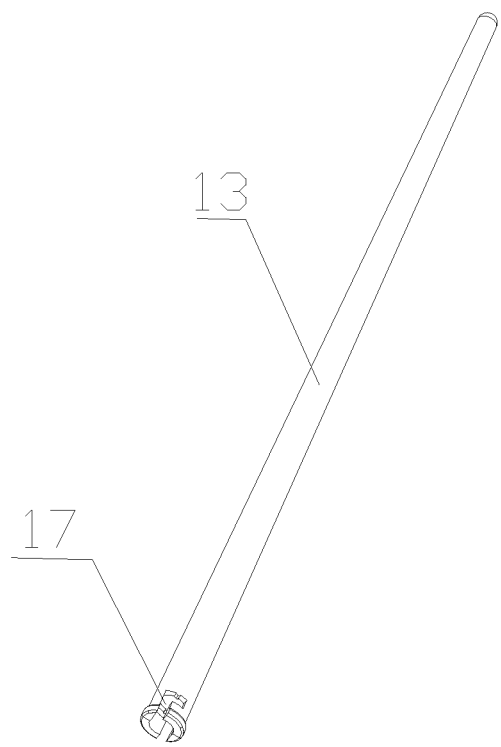
FIG. 2 is a schematic diagram of a casing of a fireworks lamp of the present disclosure.
Figure 3:
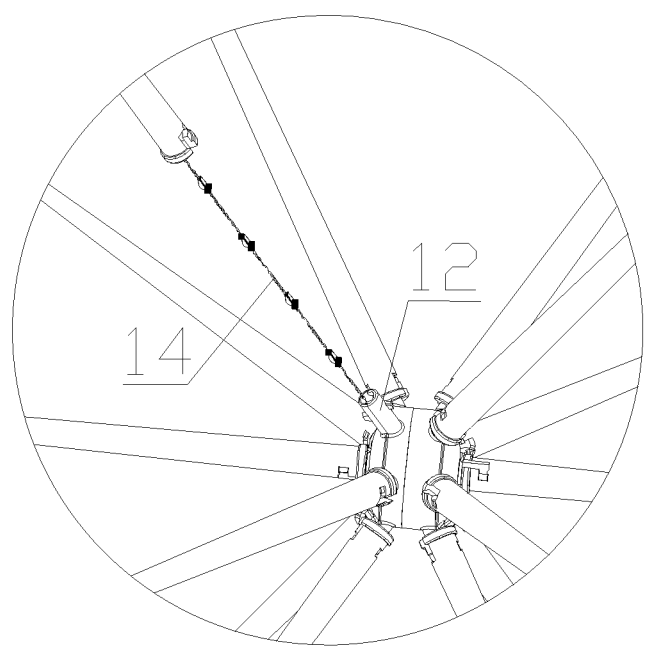
FIG. 3 is a partially enlarged diagram of FIG. 1.

The present disclosure provides a fireworks lamp. As shown in FIG. 1 to FIG. 3, the fireworks lamp includes one connector 11, a plurality of connection sleeves 12 and a plurality of casings 13. The connector 11 has at least one circular section, and the plurality of connection sleeves 12 are arranged at a periphery of the circular section at equal intervals. The plurality of connection sleeves 12 are located on the outer surface of the connector 11 and extend outward from the outer surface of the connector 11 for snap-in fixed connection with the plurality of casings.

Specifically, as shown in FIG. 2, each casing 13 has a hollow elongated tubular structure, one end of which is connected to each connection sleeve 12 and has an opening, and the other end is sealed. Each casing 13 preferably has a semi-transparent or transparent structure, inside of which is provided with a copper wire light 14 or other light-emitting source (as shown in FIG. 3). The copper wire lights or other light sources are arranged in the hollow casings 13 to realize integration of an illumination function and a decorative function. The casings 13 can be made of glass, plastic or other materials. In other embodiments, the cross section of each casing 13 can have other shapes, such as square or rectangular.

Specifically, each casing is integrally formed.

Figure 14:
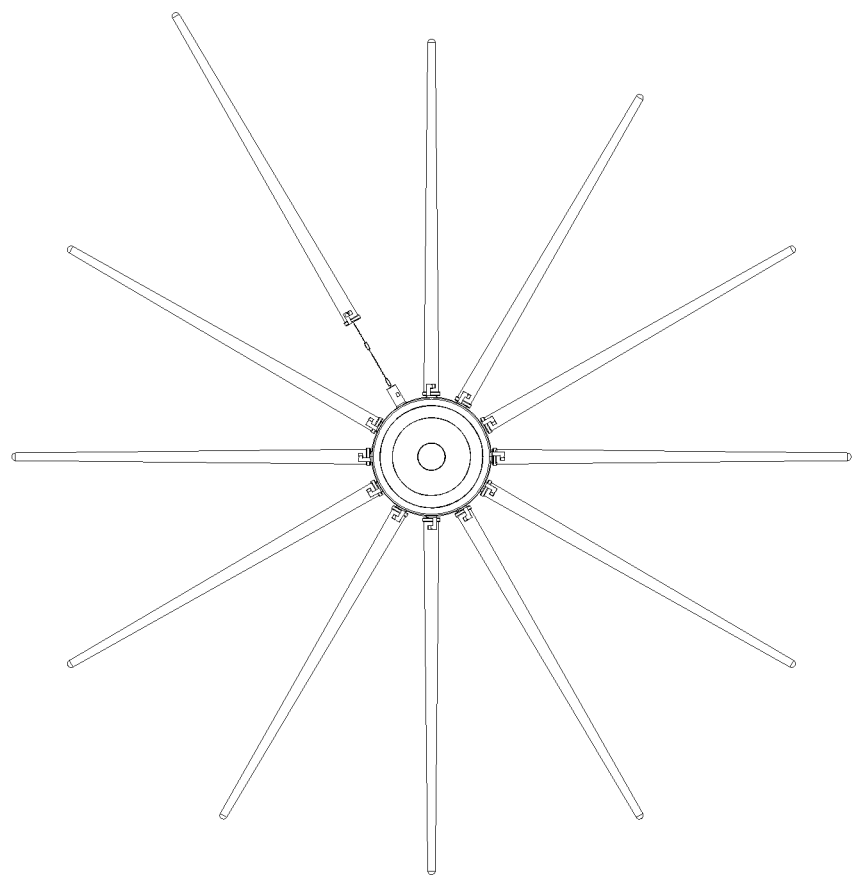
FIG. 14 is an overall schematic diagram of a disk fireworks lamp with a battery box, provided by the present disclosure.
Figure 15:
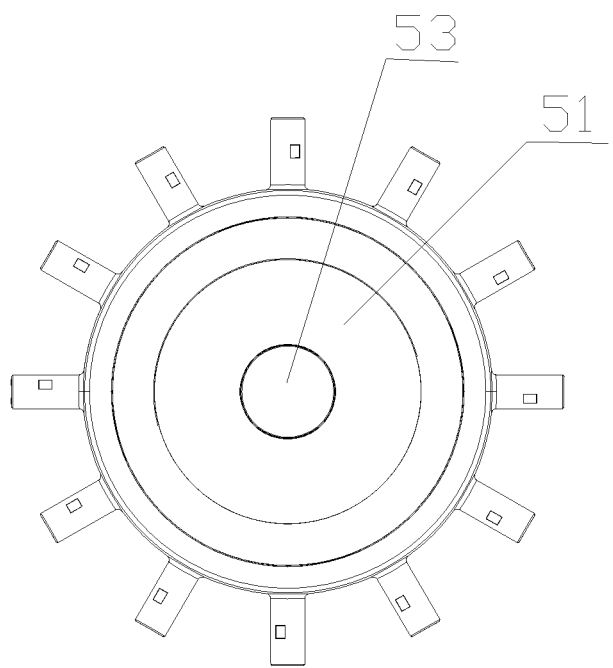
FIG. 15 is a front view of a disk shell of a disk fireworks lamp with a battery box, provided by the present disclosure.

Further, the fireworks lamp can include one row or a plurality of rows of connection sleeves 12 arranged on the outer surface of the connector 11. When there is one row of connection sleeves 12, as shown in FIG. 14 and FIG. 15, the connection sleeves 12 and the corresponding casings 13 only extend in one plane. The connector 11 can be provided with a body having a disk shape, so that the whole structure is relatively compact, inside of which is provided with a battery for power supply, and the fireworks lamp can be hung on a wall. When there are two rows of connection sleeves 12, as shown in FIG. 4, the center axis of the connector 11 can also be provided with two connection sleeves 12, so that the fireworks lamp has a strong symmetry, outstanding three-dimensional effect and better decorative effect, and can be fixed on the ground by means of a grounding pin or fixed at a high place.

Figure 4:
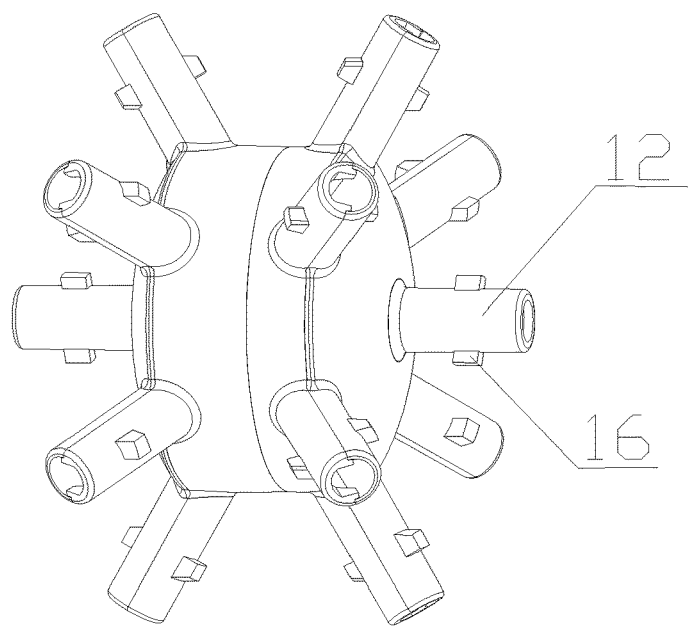
FIG. 4 is a schematic structural diagram of a connector of a fireworks lamp of the present disclosure.
Figure 5:
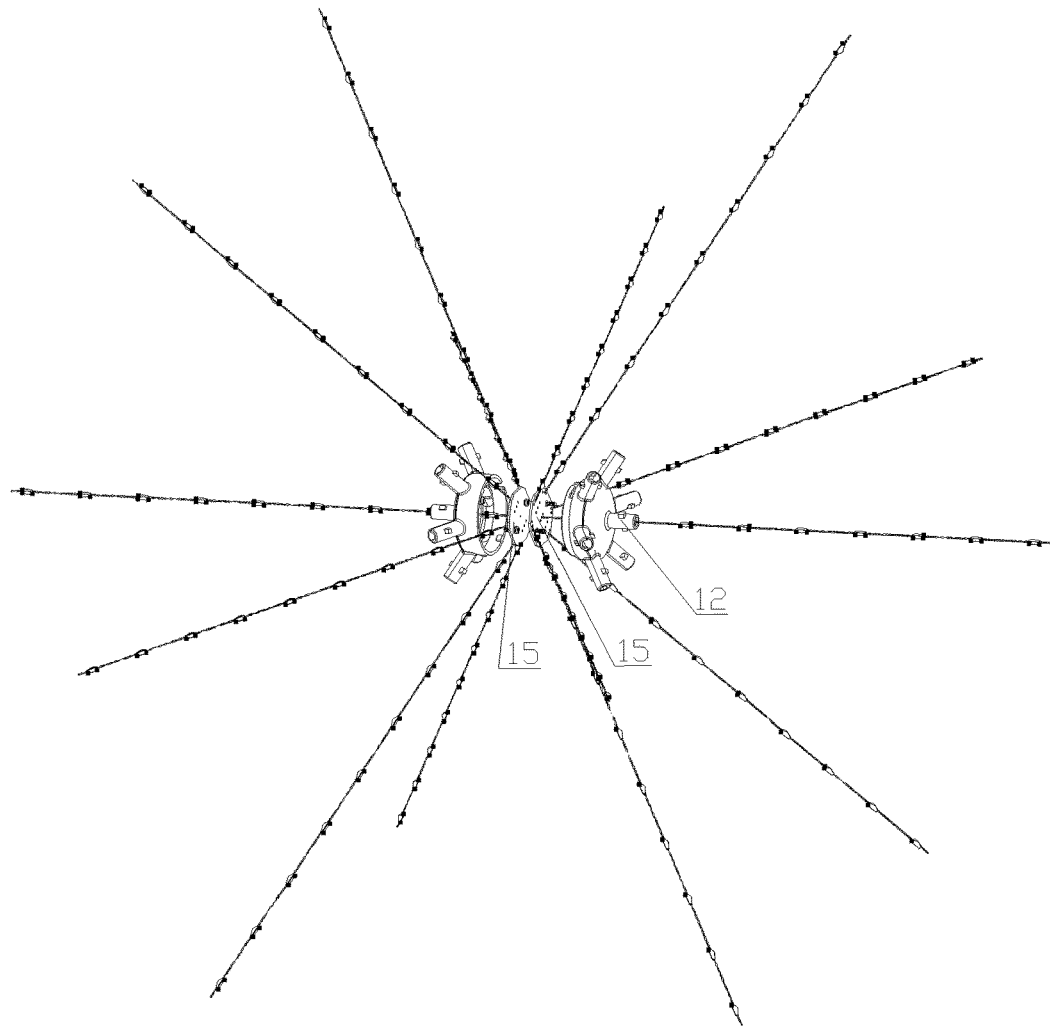
FIG. 5 is a schematic structural diagram of inside of a fireworks lamp of the present disclosure.

In one embodiment, as shown in FIG. 4 and FIG. 5, the connector 11 includes two disks that can be buckled together forming a cavity (i.e. the interior of the connector 11 is hollow), in which a circuit board 15 is provided to control the copper wire lights or other illumination sources to be turned on, turned off and in various changes to realize changeable illumination. The plurality of connection sleeves 12 are arranged on outer surfaces of the two disks. Preferably, the plurality of connection sleeves 12 are symmetrically disposed, each of them is a base of each casing 13 and is in snap-in connection with each hollow casing 13. After the plurality of hollow casings 13 are all installed, a shape of fireworks is shown, which is amazing. Each connection sleeve 12 is axially split into two symmetrical halves from the center of the cross section thereof, with one half is integrally connected with the disk, and the other half is connected with a top cover (as shown in FIG. 4). One connection sleeve is arranged in the center of the top cover. The half integrally connected with the disk and the other half connected with the top cover are buckled together after the copper wire light is installed.

Specifically, referring to FIG. 4, one or more stop blocks 16 (two stop blocks are preferred) are symmetrically arranged on an outer wall of each connection sleeve 12; one or more stop clamping slots 17 matching with the stop blocks 16 are symmetrically formed in the bottom of each casing 13. The stop blocks and the stop clamping slots are snap-in fixed, so that the connection between devices or components is more stable. Preferably, the stop clamping slot 17 has a L shape, and includes a longitudinal slot in a lengthwise direction of the casing 13 and a transverse slot perpendicular to the longitudinal slot; and the end having an opening of the casing 13 is provided with a trapezoid stop block, as shown in FIG. 2. During use, the casing 13 is sleeved to the outer side of the connection sleeve 12; the stop blocks are inserted into the longitudinal slots of the stop clamping slots 17; then the casing 13 is rotated to cause the stop blocks on the outer side of the casing 13 to enter the transverse slots of the L-shaped stop clamping slots to realize snap-in fixing. This structure is firmer in connection and more attractive than an inserted-connected structure or a sleeved structure in the prior art.

The casing 13 has a transparent or semi-transparent structure, in which a wire like light source, preferably a copper wire light, is arranged. The copper wire light can has a two-wire, three-wire or four-wire structure; the copper wire light has a length at least exceeds a half of that of the casing 13. The circuit board arranged in the connector is used to control light emission of the copper wire light to achieve a dynamic light-emitting effect and a colorful illumination effect.

Specifically, the power supply of the copper wire light can be supplied by a battery or mains supply by means of a transformer. The battery can be set in the connector 11 or arranged in the grounding pin below the connector when it is used as a power supply. The battery can be a dry battery, a rechargeable lithium battery or a solar battery.

Figure 6:
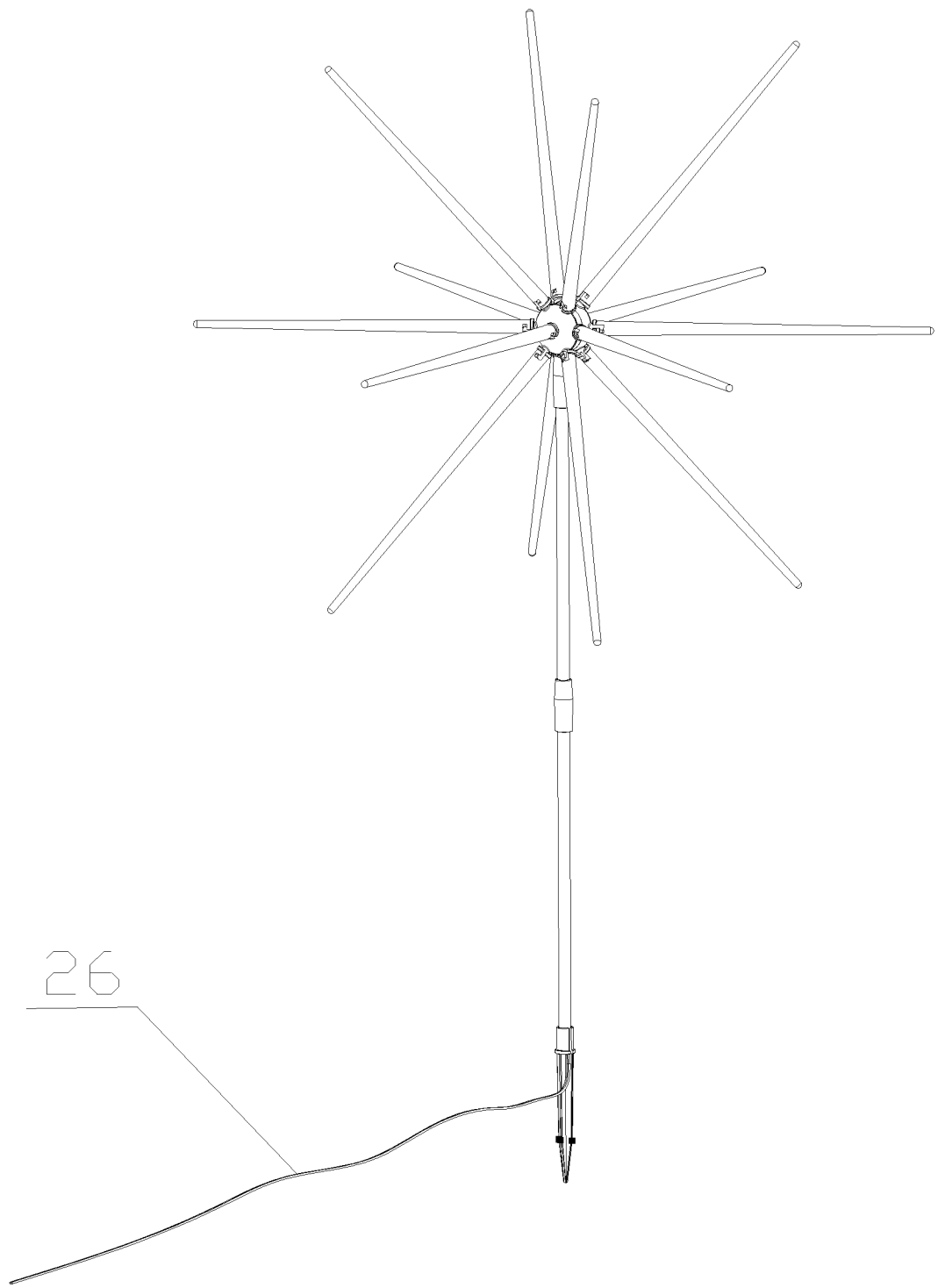
FIG. 6 is an overall schematic diagram of a floor fireworks lamp powered by a lead wire, provided by the present disclosure.
Figure 7:
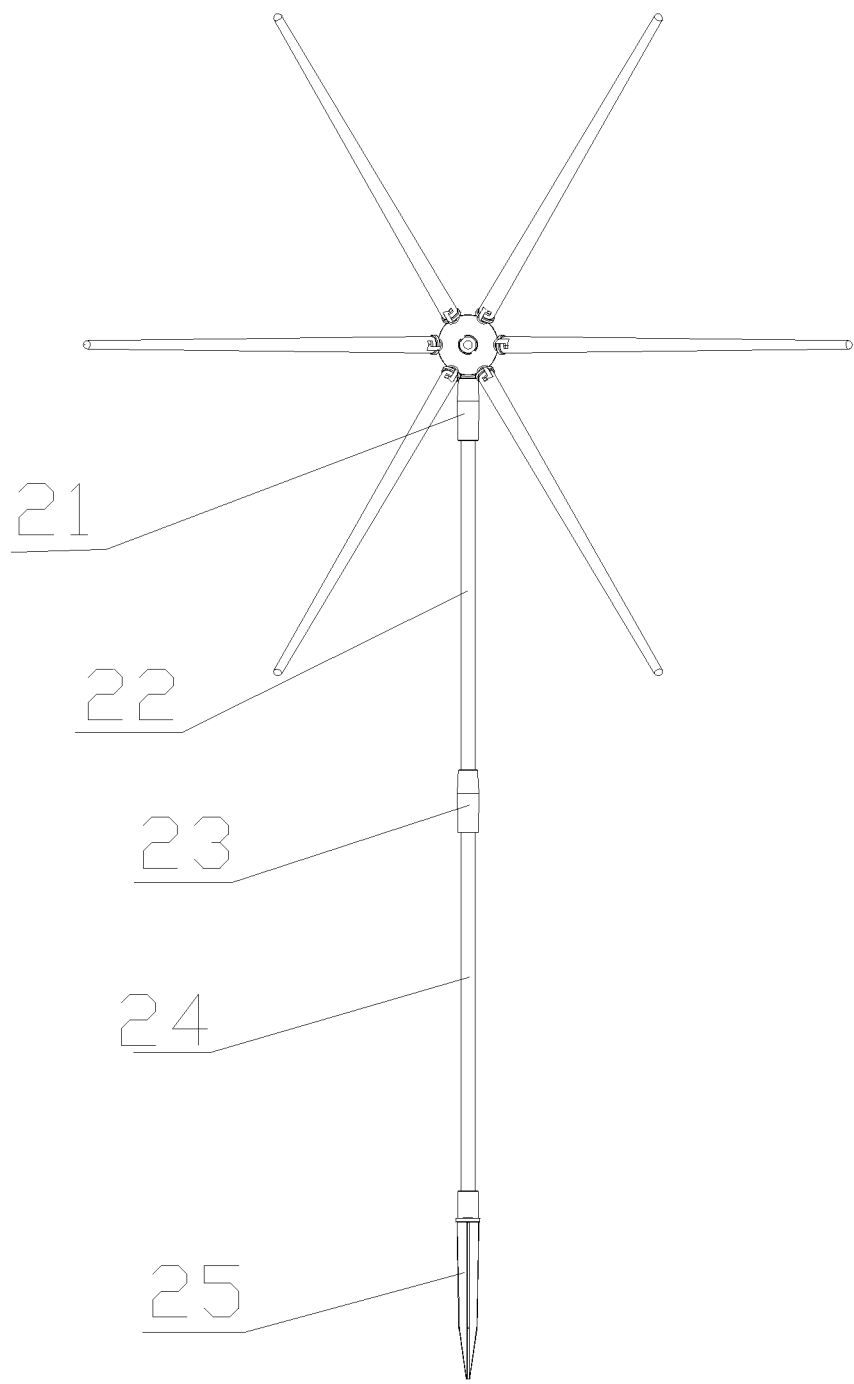
FIG. 7 is the second overall schematic diagram of a floor fireworks lamp powered by a lead wire, provided by the present disclosure.

The present disclosure further provides another embodiment, as shown in FIG. 6 and FIG. 7, a floor fireworks lamp powered by a lead wire, including the above-mentioned fireworks lamp, and further including the first connector 21, the first connection pipe 22, the second connector 23, the second connection pipe 24, a plug rod 25 and a lead wire 26.

Further, the first connector 21 has a hollow casing structure used to connect the fireworks lamp to one end of the first connection pipe 22; the second connector 23 is used to connect the other end of the first connection pipe 22 to one end of the second connection pipe 24; and the other end of the second connection pipe 24 is connected to the plug rod 25.

Further, the fireworks lamp, the first connector 21, the first connection pipe 22, the second connector 23, the second connection pipe 24 and the plug rod 25 are detachably connected.

Further, the second connector 23 is an antiskid sleeve. The arrangement of the antiskid sleeve is favorable for improving the holding stability to avoid slipping.

Further, the plug rod 25 has a sharp part at the head to facilitate plugging the equipment on the floor, which improves the flexibility of the equipment. Moreover, the sharp part preferably has an arrow shape.

Further, the lead wire 26 exported from the fireworks lamp passes through the first connection pipe 22 and the second connection pipe 24 in sequence, and is finally exported from the plug rod 25 for plugging and power supplying.

Figure 8:
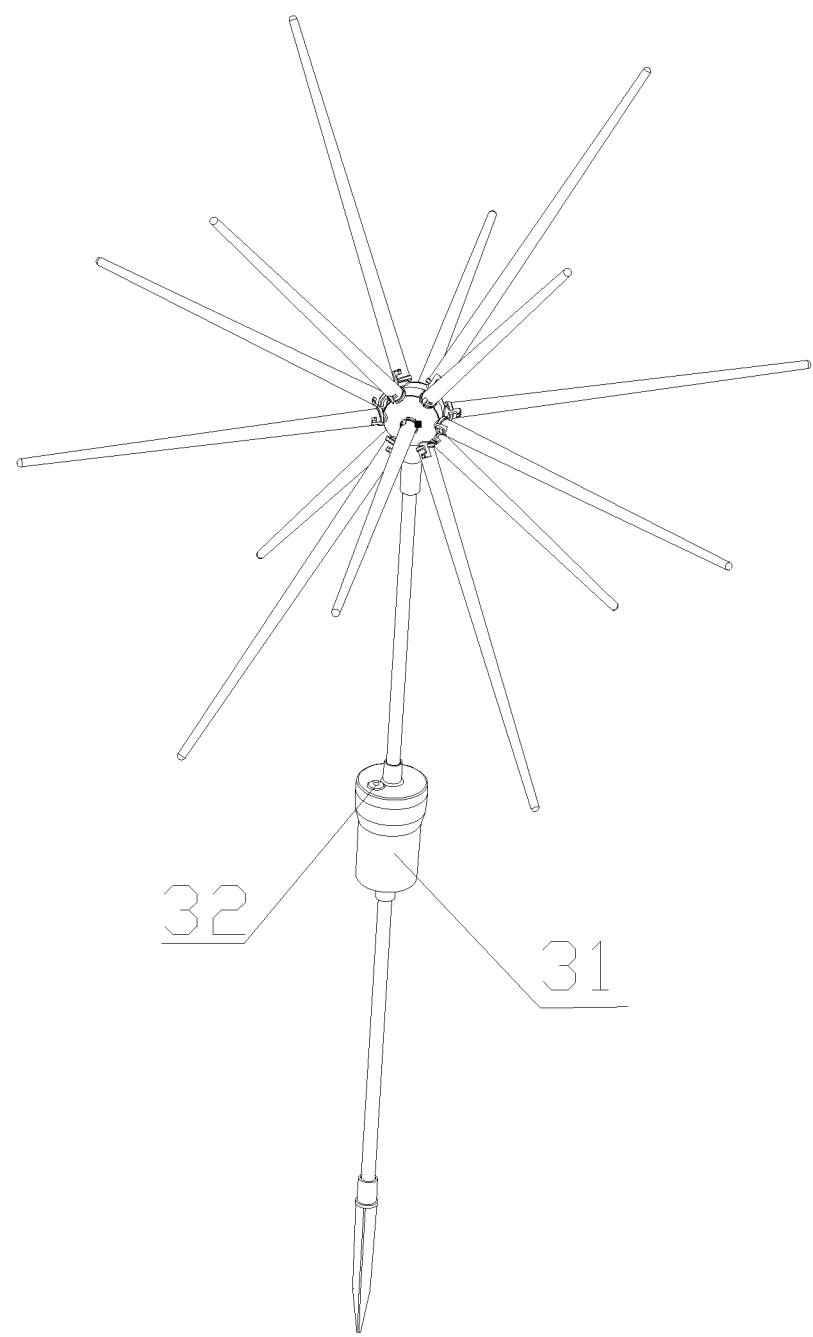
FIG. 8 is a schematic diagram of a floor fireworks lamp powered by a battery bin, provided by the present disclosure.
Figure 9:
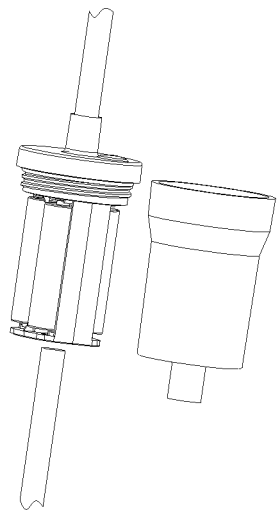
FIG. 9 is a schematic diagram of a battery bin of a floor fireworks lamp powered by a battery bin, provided by the present disclosure.

The present disclosure further provides another embodiment, as shown in FIG. 8 and FIG. 9, a floor fireworks lamp powered by a battery bin, including the above-mentioned fireworks lamp, the first connector, the first connection pipe and the second connection pipe, and further including a battery bin 31. Compared with the floor fireworks lamp powered by a lead wire, the present embodiment is different that the second connector of the latter is replaced with the battery bin 31, and the plug wire exported from the plug rod is canceled, so that the present embodiment can supply power to the fireworks lamp by means of a battery.

Further, the battery bin 31 has a substantially cylindrical outline. A housing of the battery bin can be screwed off to install or remove the battery. Joints are respectively arranged on the upper surface and the lower surface of the battery bin, the joint on the upper surface is detachably connected with the first connection pipe, and the joint on the lower surface is detachably connected with the second connection pipe.

Further, the battery bin 31 is electrically connected to the fireworks lamp through the lead wire.

Further, the surface of the battery bin 31 is provided with a power button 32 used to turn on or turn off the fireworks lamp.

During use, the first connection pipe is firstly mounted at the bottom of the battery bin 31, and then a locking-type plug is sleeved at the tail part of the first connection pipe and is fixedly connected to the connector and the battery bin 31 by means of the second connection pipe. During installation of the casings, the circuit board and the copper wire lights on the circuit board are firstly placed in the center; the two disks of the connector are then sleeved on the outer sides of the copper wire lights and the circuit board; one copper wire light is sleeved in each connection sleeve; the two disks are buckled; the copper wire light is fixed relative to each connection sleeve; the stop clamping slots and the stop blocks are in snap-in connection; and the casings are snapped in the corresponding connection sleeves, in such a way that the whole device is installed completely. The fireworks lamp is controlled by means of the power button 32 to be turned on or turned off.

Figure 10:
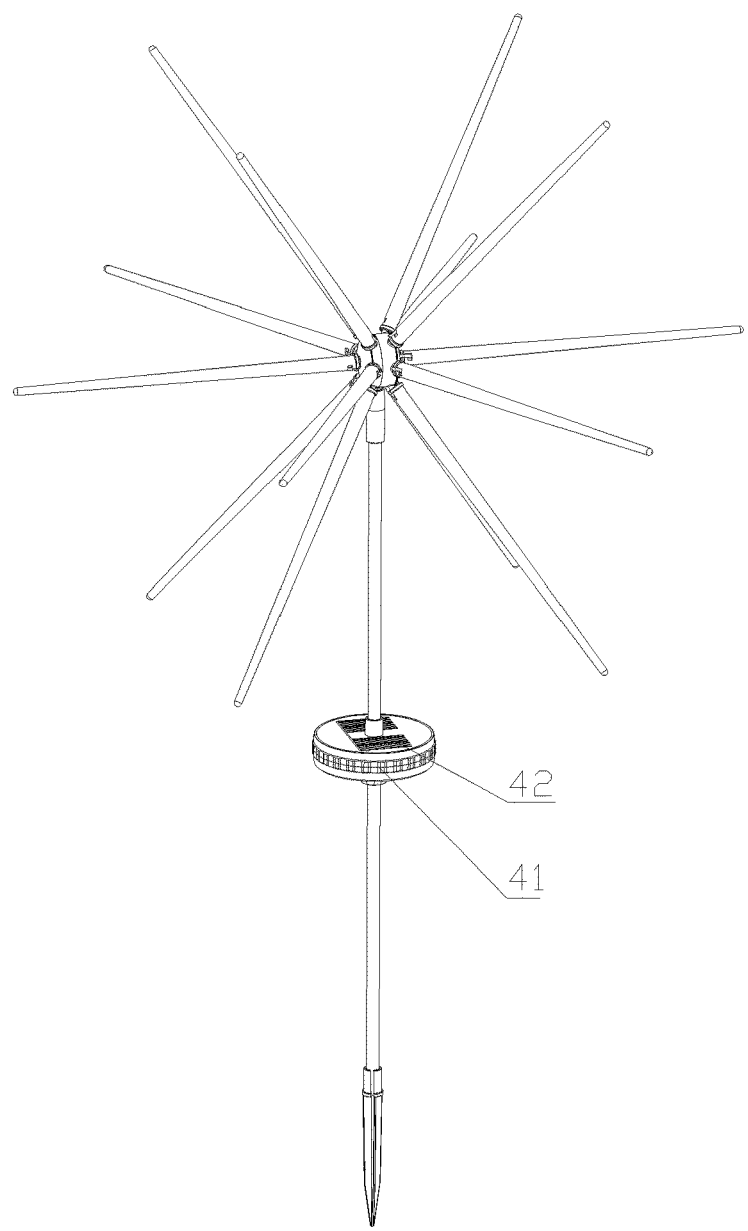
FIG. 10 is an overall schematic diagram of a floor fireworks lamp powered by a solar panel, provided by the present disclosure.

The present disclosure further provides another embodiment, as shown in FIG. 10, a floor fireworks lamp powered by a solar panel, including the above-mentioned fireworks lamp, the first connector, the first connection pipe and the second connection pipe, and further including a battery box 41. The top of the battery box is provided with a solar battery panel 42. Compared with the floor fireworks lamp powered by a battery bin, the present embodiment is different that the battery bin of the latter is replaced with the battery box 41 with the solar battery panel, so that the present embodiment can supply power to the fireworks lamp by means of solar energy.

Figure 11:
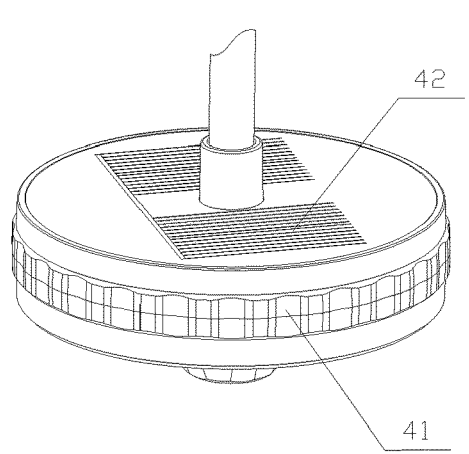
FIG. 11 is a schematic diagram of a battery box of a floor fireworks lamp powered by a solar panel, provided by the present disclosure.
Figure 12:
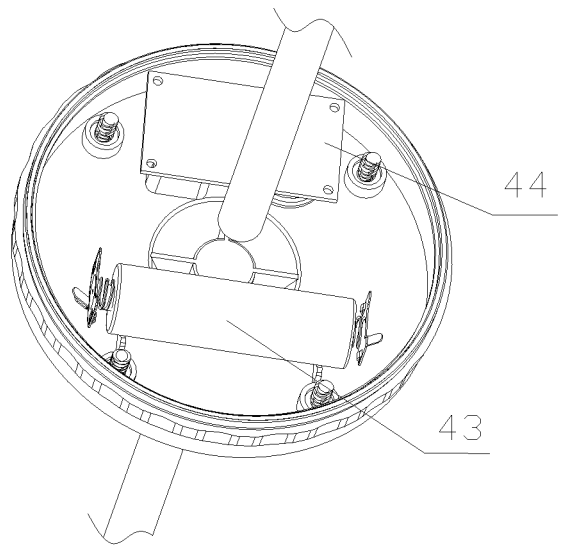
FIG. 12 is a schematic diagram of inside of a battery box of a floor fireworks lamp powered by a solar panel, provided by the present disclosure.

Further, as shown in FIG. 11 and FIG. 12, the top of the battery box 41 is provided with the solar battery panel 42; the top of the inner wall of the battery box 41 is fixedly connected with a storage battery 43; and a position, located on one side of the storage battery 43, on the inner wall of the battery box 41 is fixedly connected with a circuit board 44.

Figure 13:
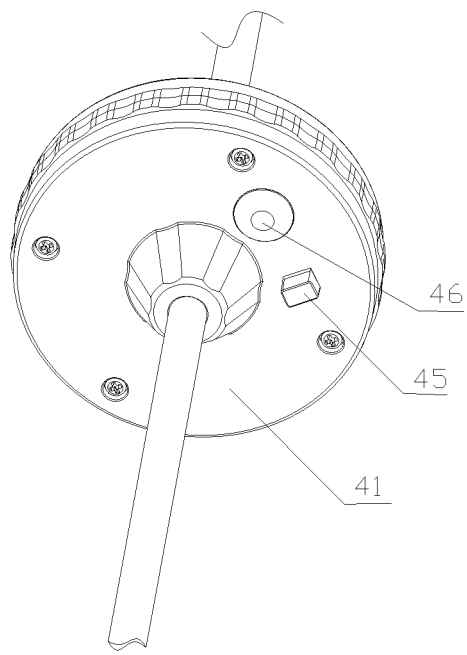
FIG. 13 is a schematic diagram of a bottom of a battery box of a floor fireworks lamp powered by a solar panel, provided by the present disclosure.

Further, as shown in FIG. 13, the bottom of the battery box 41 is fixedly connected with a switch 45; a position, located on one side of the switch 45, at the bottom of the battery box 41 is fixedly connected with a function key 46, so as to fast and conveniently operate the equipment.

Further, the center of the top of the battery box 41 is connected with the first connection pipe, and the center of the bottom of the battery box is connected with the second connection pipe.

Further, the solar battery panel 42, the switch 45, the function key 46, the storage battery 43 and the circuit board 44 are electrically connected with one another through lead wires to facilitate better control over the equipment. Specifically, the solar battery panel 42 can be of one separate structure, or can be two symmetric solar battery panels 42.

During use, the first connection pipe is fixedly connected to the bottom of the battery box 41; then a connection plug is sleeved at the bottom of the first connection pipe and is fixedly connected to the battery box 41 and the connector by means of the second connection pipe; and the outer walls of the connection sleeves on the connector are provided with stop blocks. During installation of the casings, the circuit board and the copper wire lights on the circuit board are firstly placed in the center; the two disks of the connector are then sleeved on the outer sides of the copper wire lights and the circuit board; one copper wire light is sleeved in each connection sleeve; the two disks are buckled; the copper wire light is fixed relative to each connection sleeve; the stop clamping slots and the stop blocks are clamped; and the casings are snapped in the corresponding connection sleeves. The connection plug is plugged to the ground; the direction of the solar battery panel 42 is adjusted according to an illumination angle of the sun, so as to efficiently make use of the solar energy; by means of the cooperative use of the solar battery panel 42 and the circuit board, the energy can be converted and transmitted to the storage battery 43, so that a continuous operating state can be kept, and the endurance time is prolonged.

The present disclosure further provides another embodiment, as shown in FIG. 14 to FIG. 17, a disk fireworks lamp with a battery box, including a disk shell 51, a connection sleeve, a battery bin (II) 52, a switch 53, a lamp body and a casing. It is different from the above-mentioned fireworks lamp in that the disk fireworks lamp shell 51 has a disk shape; more than one connection sleeves for being connected to the casing are arranged on the side surface of the disk shell in an equal-angle manner; and each connection sleeve extends in a radius direction of the disk shell.

Further, the connections among the disk shell 51, the connection sleeve, the lamp body, and the casing are the same as those of the fireworks lamp.

Further, the switch 53 is arranged in the center of the disk shell surface and can be used to control the disk fireworks lamp; and the battery bin (II) 52 and a hanging hole 54 are arranged on the disk shell surface opposite to the disk shell surface provided with the switch 53. By the arrangement of the hanging hole 54, the disk fireworks lamp with a battery box can be hung at a proper position.

Figure 16:
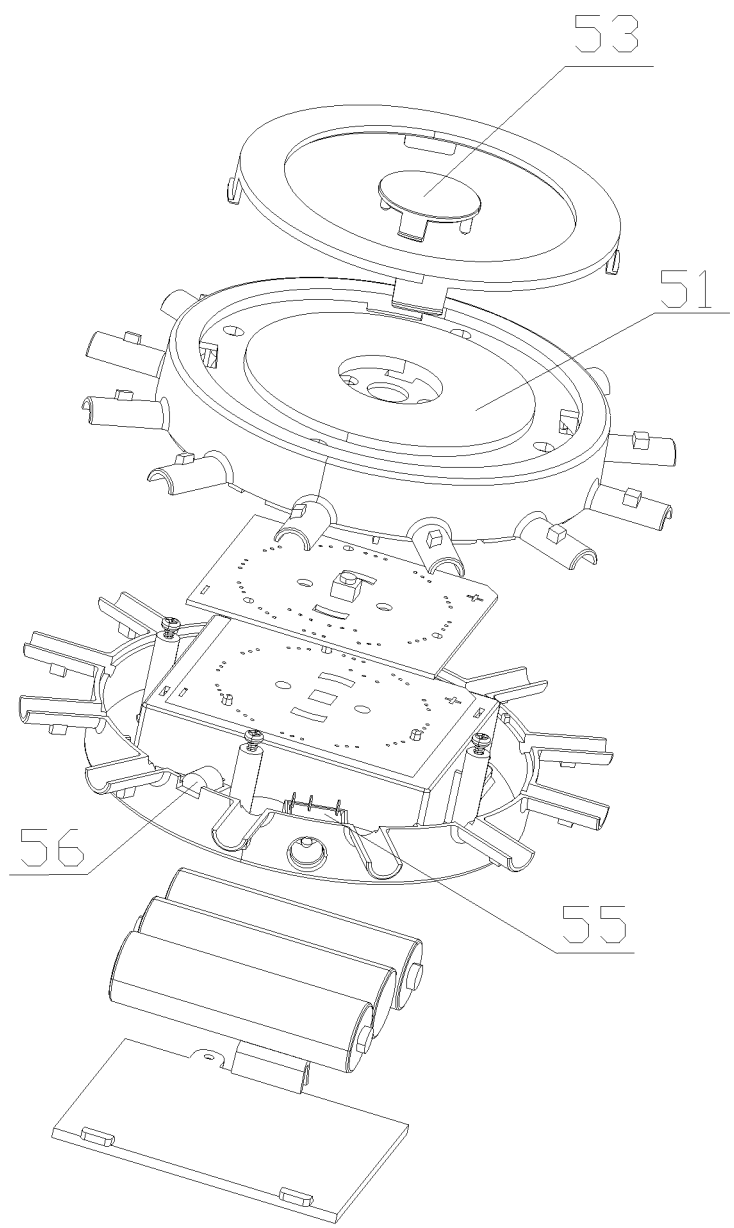
FIG. 16 is an exploded schematic diagram of a disk fireworks lamp with a battery box, provided by the present disclosure.
Figure 17:
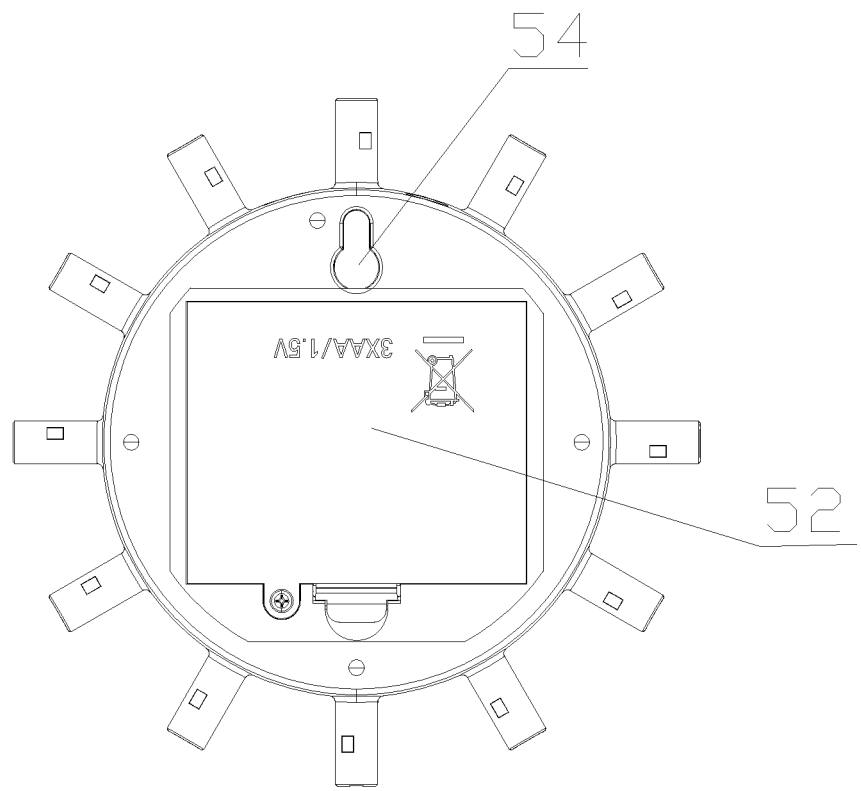
FIG. 17 is a rear view of a disk shell of a disk fireworks lamp with a battery box, provided by the present disclosure.

Further, as shown in FIG. 16, a microphone 55 and an AC converter 56 are also arranged on the side surface of the disk shell 51.

Figure 18:
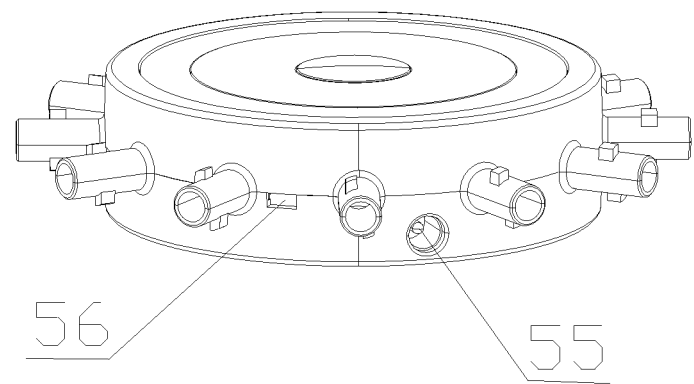
FIG. 18 is another view of a disk shell of a disk fireworks lamp with a battery box, provided by the present disclosure.
Figure 19:
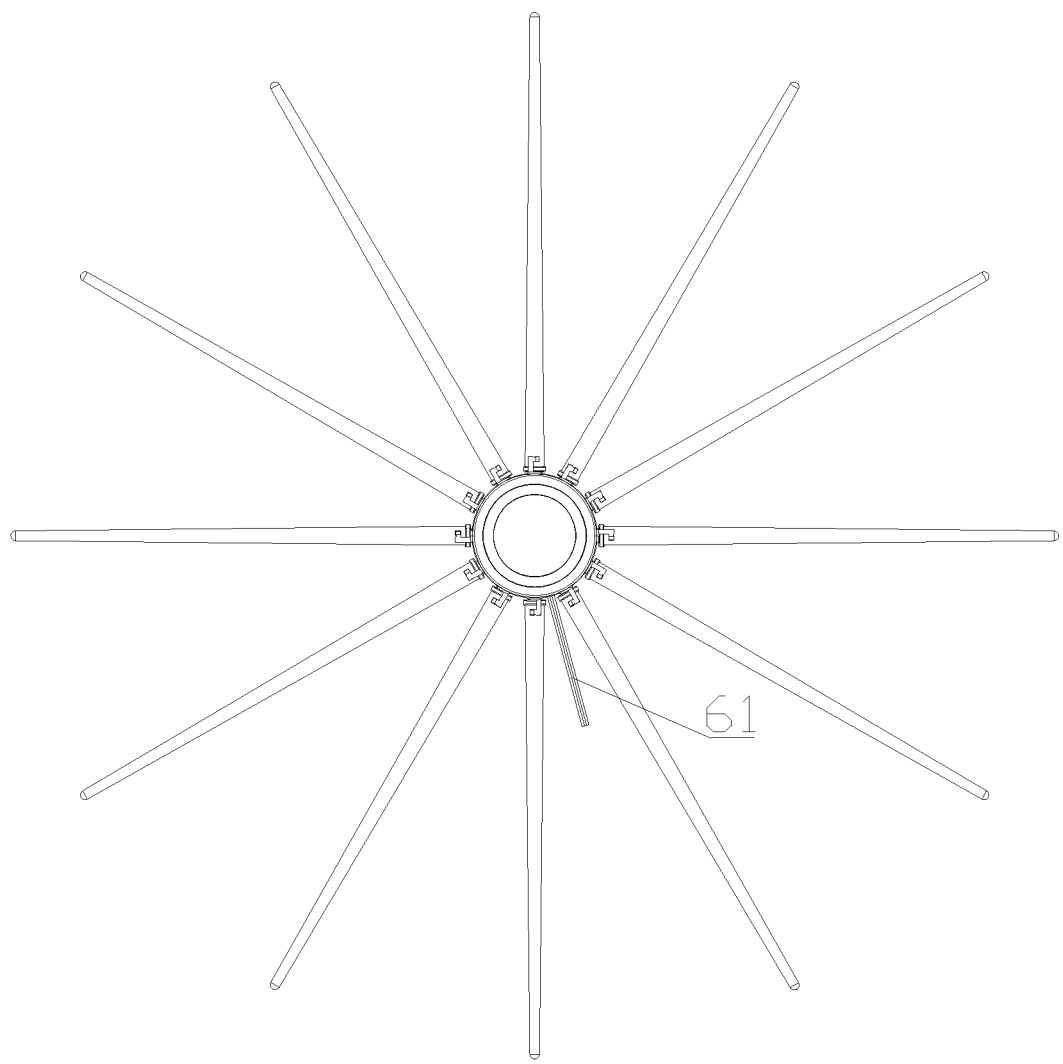
FIG. 19 is a front view of a plug-in disk fireworks lamp provided by the present disclosure.
Figure 20:
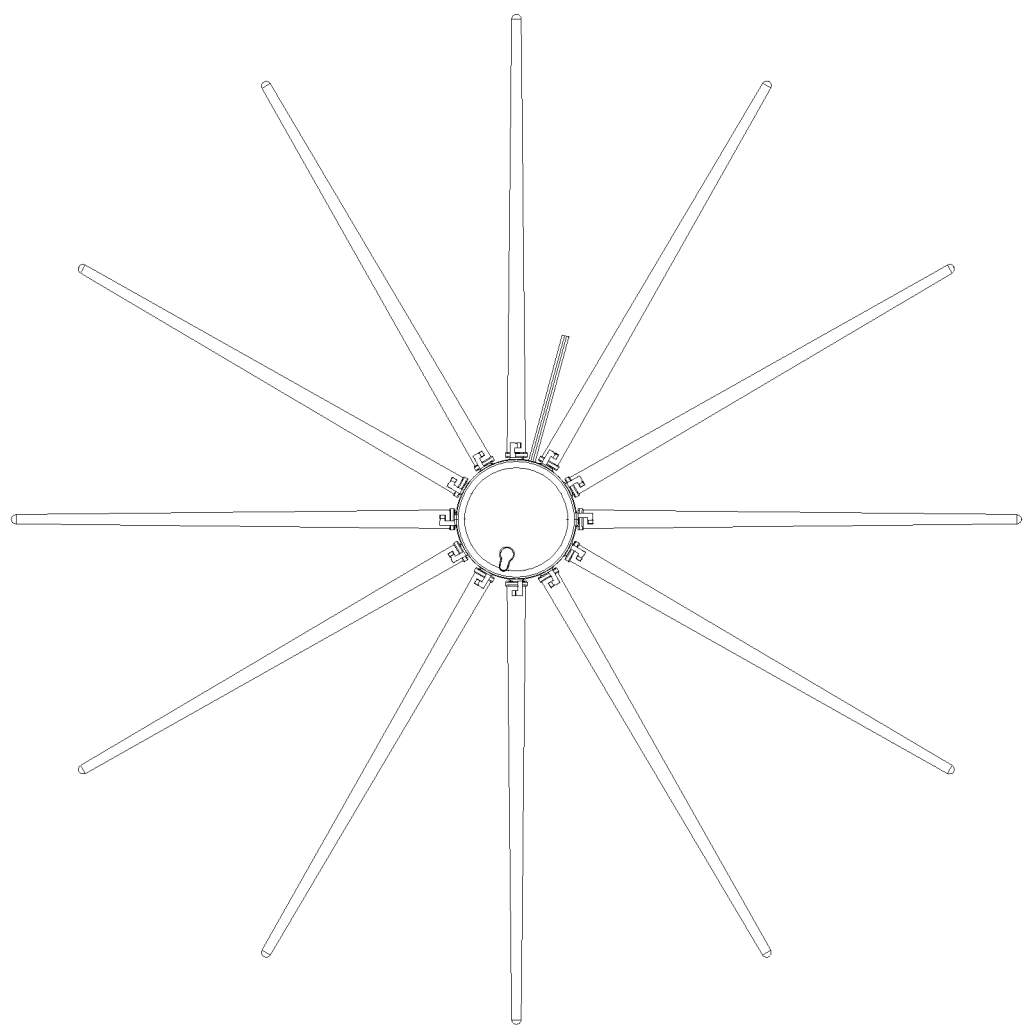
FIG. 20 is a rear view of a plug-in disk fireworks lamp provided by the present disclosure.

The present disclosure further provides another embodiment, as shown in FIG. 18 and FIG. 19, a plug-in disk fireworks lamp. It is different from the above-mentioned disk fireworks lamp with a battery box in that the battery bin (II) and the switch on the surface are canceled, but a wire 61 is connected to an external power supply for power supplying instead.

Further, the wire 61, the circuit board in the disk shell and the lamp body are electrically connected.

Figure 21:
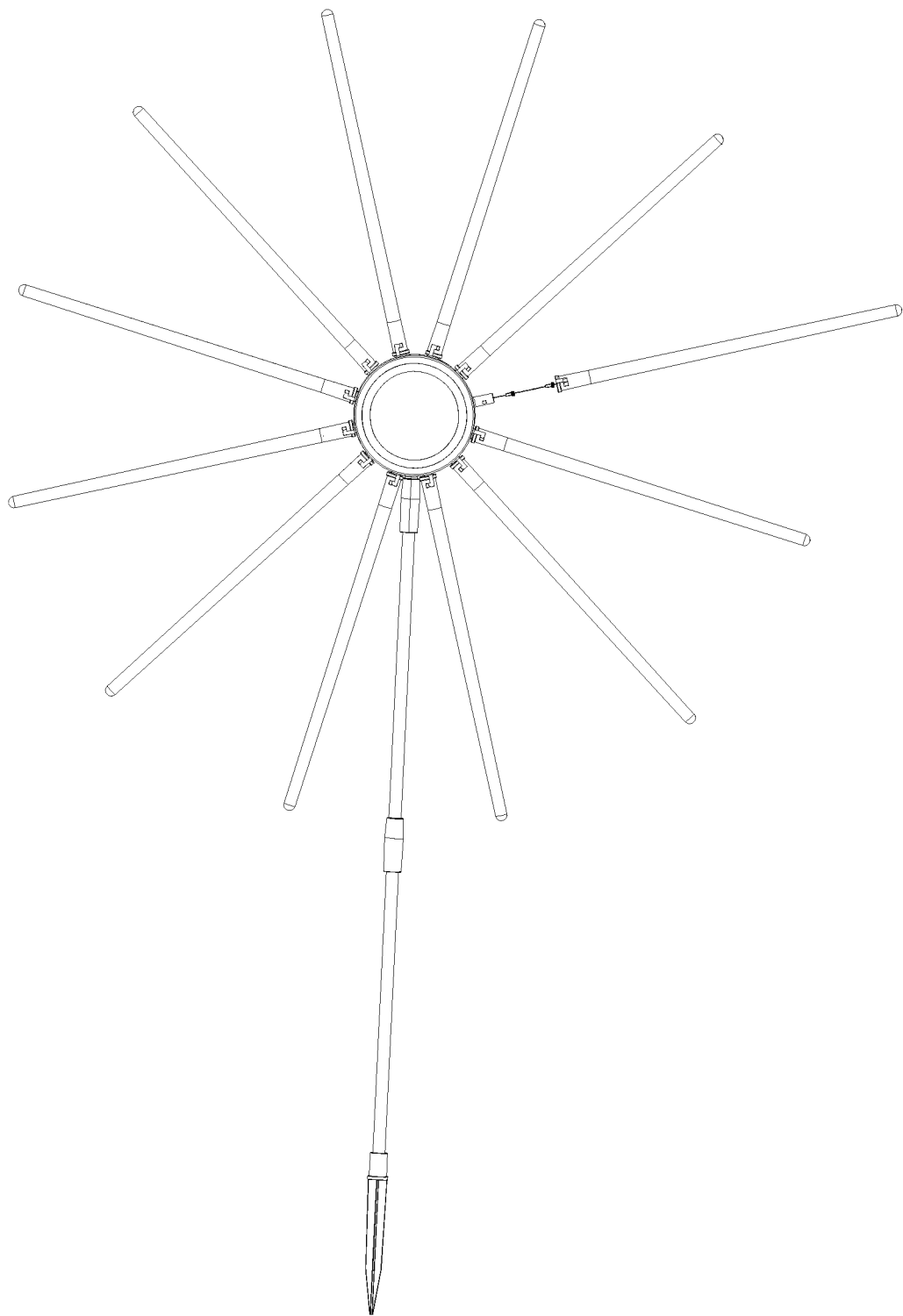
FIG. 21 is a schematic diagram of a floor disk fireworks lamp provided by the present disclosure.

The present disclosure further provides another embodiment, as shown in FIG. 21, a floor disk fireworks lamp, including the above-mentioned disk fireworks lamp, and further including a plug rod. The disk fireworks lamp is connected with the plug rod through the first connector.

The present disclosure has the advantages of convenience in carrying and installation and adaptability to various occasions.

Finally, it should be noted that the above descriptions are only preferred embodiments of the present disclosure and are not intended to limit the present disclosure. Although the present disclosure has been described in detail with reference to the foregoing embodiments, those skilled in the art can still modify the technical solutions in the foregoing various embodiments, or equivalently replace partial technical features. Any modifications, equivalent replacements, improvements, etc. that are made within the principle of the present disclosure shall all fall within the protection scope of the present disclosure.

What is claimed is:

1. A fireworks lamp, comprising a shell structure, a lamp body structure and a circuit board, wherein the shell structure comprises a connector and a plurality of connection sleeves, the lamp body structure comprises a plurality of casings and light-emitting light sources arranged inside the plurality of casings, the connector has at least one circular section, and the plurality of connection sleeves are arranged at a periphery of the circular section at equal intervals, the plurality of casings, light-emitting light sources and connection sleeves have the same quantity, the plurality of casings are in snap-in connection with the plurality of connection sleeves, and the plurality of casings have a semi-transparent or transparent structure;

an outer wall of each connection sleeve is provided with one or more stop blocks, and a bottom of each casing is symmetrically provided with one or more stop clamping slots matching with the stop blocks;

each stop clamping slot has an L shape and comprises a longitudinal slot in a lengthwise direction of each casing and a transverse slot perpendicular to the longitudinal slot, and an end having an opening of each casing is provided with a trapezoid stop block; part or all of the plurality of connection sleeves are formed by buckling two symmetric parts;

the trapezoid top block is arranged on the transverse slot and configured for locking the stop block on the connection sleeve at an end of the transverse slot.

2. The fireworks lamp of claim 1, wherein each light-emitting light source is a copper wire light, and the copper wire light in each casing has a length greater than half of that of each casing.

3. The fireworks lamp of claim 1, wherein the plurality of connection sleeves extend outward from the connector in a radial manner, and are symmetrically disposed on a surface of the connector.

4. The fireworks lamp of claim 1, wherein the connector has a disk shape, and the plurality of connection sleeves are arranged in the same plane.

5. The fireworks lamp of claim 1, wherein the plurality of light-emitting light sources are fixedly connected with the circuit board.

6. A floor decorative lamp, comprising the fireworks lamp of claim 1 and a plug rod, wherein the plug rod is connected with the fireworks lamp.

7. The floor decorative lamp of claim 6, wherein the plug rod is provided with an antiskid casing, a battery bin or a solar battery box.

8. The floor decorative lamp of claim 6, further comprising a first connector, a first connection pipe, a second connector, and a second connection pipe.

9. The floor decorative lamp of claim 8, wherein the fireworks lamp, the first connector, the first connection pipe, the second connector, the second connection pipe and the plug rod are detachably connected.

10. The floor decorative of claim 8, wherein the plug rod has a sharp part at the head.

11. The fireworks lamp of claim 1, wherein each casing has a cross section of square or rectangular.

12. The fireworks lamp of claim 1, wherein the fireworks lamp comprises one row of connection sleeves which arranged on the outer surface of the connector.

* * * * *